(12) United States Patent
Jung et al.

(10) Patent No.: US 7,697,734 B2
(45) Date of Patent: Apr. 13, 2010

(54) METHOD AND APPARATUS OF DETECTING EYE USING SYMMETRY AND MOMENT CHARACTERISTICS OF OBJECT

(75) Inventors: Sung Uk Jung, Seoul (KR); Yun Su Chung, Daejeon (KR); Jang Hee Yoo, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 986 days.

(21) Appl. No.: 11/445,062

(22) Filed: Jun. 1, 2006

(65) Prior Publication Data

US 2006/0222215 A1    Oct. 5, 2006

(30) Foreign Application Priority Data

Nov. 19, 2005    (KR) .................... 10-2005-0111034

(51) Int. Cl.
*G06K 9/00*    (2006.01)

(52) U.S. Cl. .................... 382/117; 382/118; 382/115; 382/116; 382/128

(58) Field of Classification Search .................. 382/117, 382/118, 115, 116, 128
See application file for complete search history.

(56) References Cited

U.S. PATENT DOCUMENTS

| 5,859,921 | A  | * | 1/1999 | Suzuki ...................... 382/118 |
| 6,714,665 | B1 | * | 3/2004 | Hanna et al. ................ 382/117 |
| 2003/0146901 | A1 | * | 8/2003 | Ryan ......................... 345/158 |

FOREIGN PATENT DOCUMENTS

| KR | 100292380 | 10/2000 |
| KR | 20030050306 | 6/2003 |

* cited by examiner

*Primary Examiner*—Samir A. Ahmed
*Assistant Examiner*—Mike Rahmjoo
(74) *Attorney, Agent, or Firm*—Ladas & Parry LLP (57) ABSTRACT

Provided are a method and apparatus of detecting an eye using symmetrical and moment characteristics of an object. According to the method, an eye band is extracted from a facial image, and eye candidates each having symmetry are detected by extracting symmetrical component from the eye band. After that, a moment line integral is calculated on the basis of contrast of the eye band image and a coordinate of each of the eye candidates is inputted, so that each of the detected eye candidates is verified.

8 Claims, 7 Drawing Sheets

SECOND ORDER LINE INTEGRAL MOMENT PROFILE FOR X-AXIS

FIG. 5C

SECOND ORDER LINE INTEGRAL MOMENT PROFILE FOR Y-AXIS

METHOD AND APPARATUS OF DETECTING EYE USING SYMMETRY AND MOMENT CHARACTERISTICS OF OBJECT

CROSS-REFERENCE TO RELATED PATENT APPLICATION

This application claims the benefit of Korean Patent Application No. 10-2005-0111034, filed on Nov. 19, 2005, in the Korean Intellectual Property Office, the disclosure of which is incorporated herein in its entirety by reference.

BACKGROUND OF THE INVENTION

1. Field of the Invention

The present invention relates to a method and apparatus of detecting an eye from an inputted facial image, and more particularly, to a method and apparatus of detecting an eye using symmetry and moment characteristics of an object, capable of roughly extracting an eye region from an inputted facial image to detect candidate eye regions through a symmetrical component extraction method using contrast information of the extracted image, and fast and reliably judging accuracy of a finally detected candidate eye region using normalized moment line integral obtained from the contrast information of the detected candidate eye regions.

2. Description of the Related Art

Eye detection technology used for security and user recognition roughly includes three processes of face detection, eye region extraction, and eye region verification.

To enhance the performance of eye detection recognition result, most of all, the face detection, which is a first process, should be accurately performed. Particularly, in a face recognition method using an overall characteristic of a face, how accurately detecting a facial region determines the performance of the face recognition. Since a recent method almost accurately detects a facial region, how accurately finding a coordinate of an eye from a facial region to extract elements of a face or obtain an exact facial region emerges an important subject.

Prior art methods of detecting an eye include: a method of creating projection profiles of contrast with respect to an x-axis and a y-axis, respectively, in a region including an extracted eye, finding minimum values on the x-axis and the y-axis to regard a coordinate of a minimum value as a coordinate of an eye; a template matching method using a plurality of detected eye pair candidates; and a method of detecting regions of two eyes using geometrical characteristics of a face.

However, the method of creating the projection profiles to the x and y axes to detect the coordinates of the eye has a problem of being sensitive to the brightness of an image pixel and thus has a problem that it is difficult to find an accurate coordinate of an eye when a head or eyebrows are contained in the extracted region. Also, the template matching method has problems that a standardized eye template may change depending on a database used during a process of obtaining a template and that an eye detection rate is determined depending on a critical value while passing through a binary process.

SUMMARY OF THE INVENTION

The present invention provides a method and apparatus of detecting an eye using symmetry and moment characteristics of an object, capable of preventing erroneous eye detection and allowing more reliable real-time eye detection by finding out one or more eye candidates using contrast information from an inputted facial image and a symmetrical component extraction method and applying moment line integral to the found eye candidates to finally detect an accurate eye region.

According to an aspect of the present invention, there is provided a method of detecting an eye using symmetry and moment characteristics of an object, the method including: extracting an eye band from a facial image; extracting a symmetrical component from the eye band to detect eye candidates each having symmetry; and obtaining moment line integral on the basis of contrast of an image of the eye band and inputting the obtained moment line integral to a coordinate of each of the eye candidates to verify each of the detected eye candidates.

According to another aspect of the present invention, there is provided an apparatus of detecting an eye using symmetry and moment characteristics of an object, the apparatus including: a facial image inputting unit extracting an eye band from a facial image of a user to be verified, extracting y coordinates each having a value less than a predetermined critical value from a curve obtained by calculating a projection curve of a contrast image of the eye band with respect to a y-axis, and extracting a predetermined upper band on the y-axis as the eye band and outputting the same; an eye candidate detection unit extracting symmetrical components from the extracted eye band to detect eye candidates each having symmetry; and a verification unit receiving the eye candidates to verify each of the received eye candidates using moment line integral obtained on the basis of contrast of an image of an eye.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
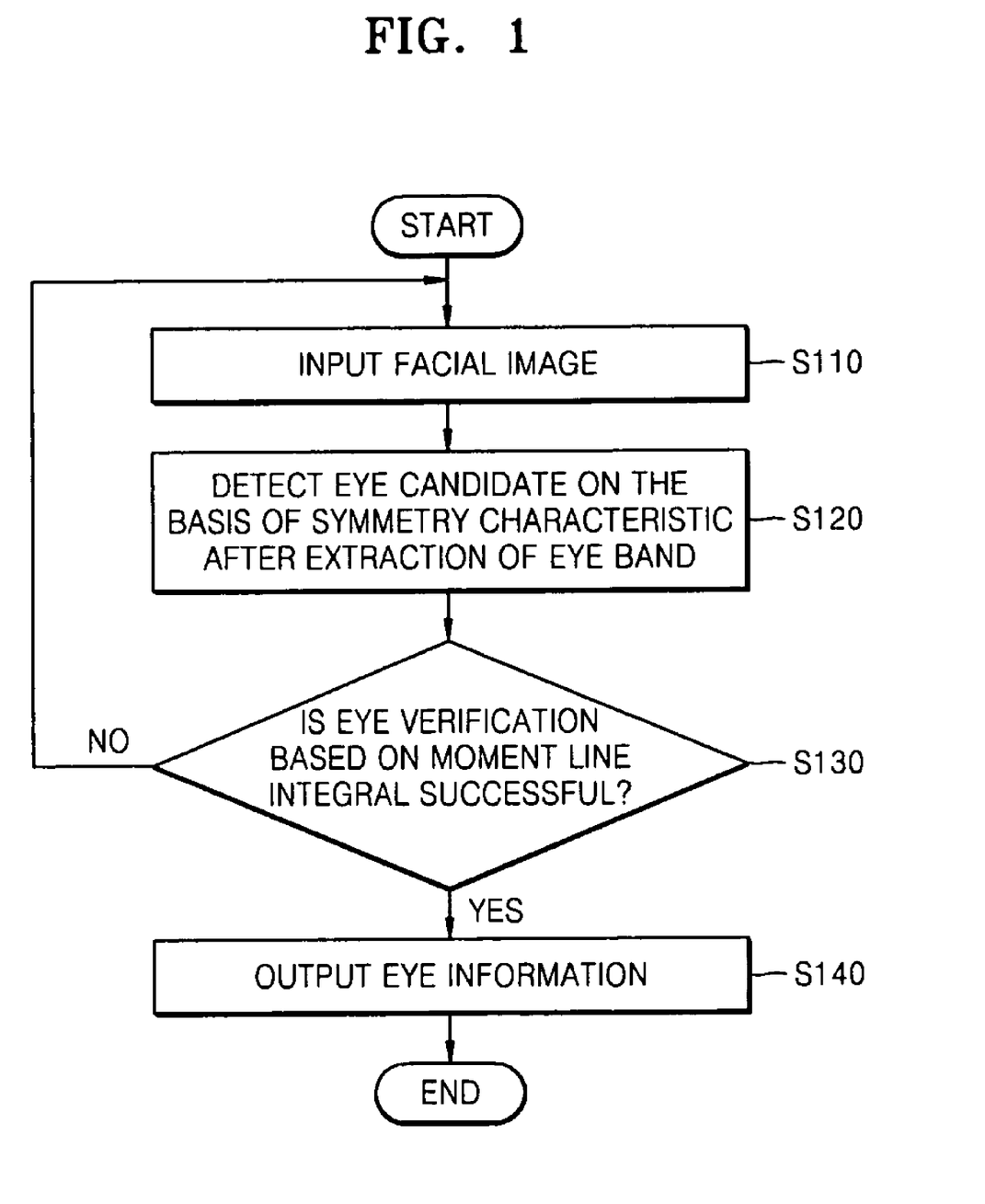
FIG. 1 is a flowchart of a method of detecting an eye according to the present invention.
Figure 2:
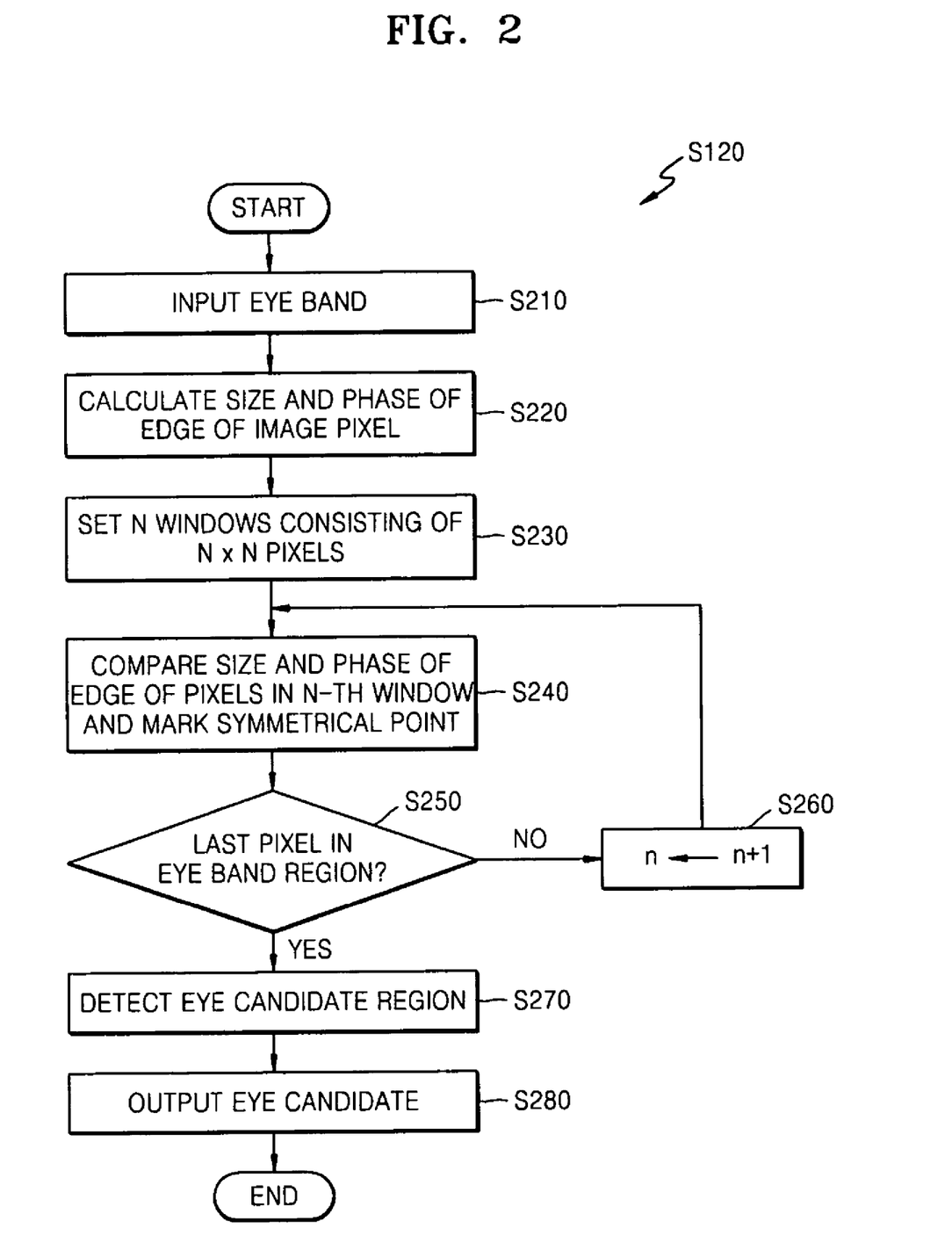
FIG. 2 is a flowchart illustrating in more detail an operation S120 of detecting eye candidate regions using a symmetrical component extraction method in a method of detecting an eye according to the present invention.
Figure 3:
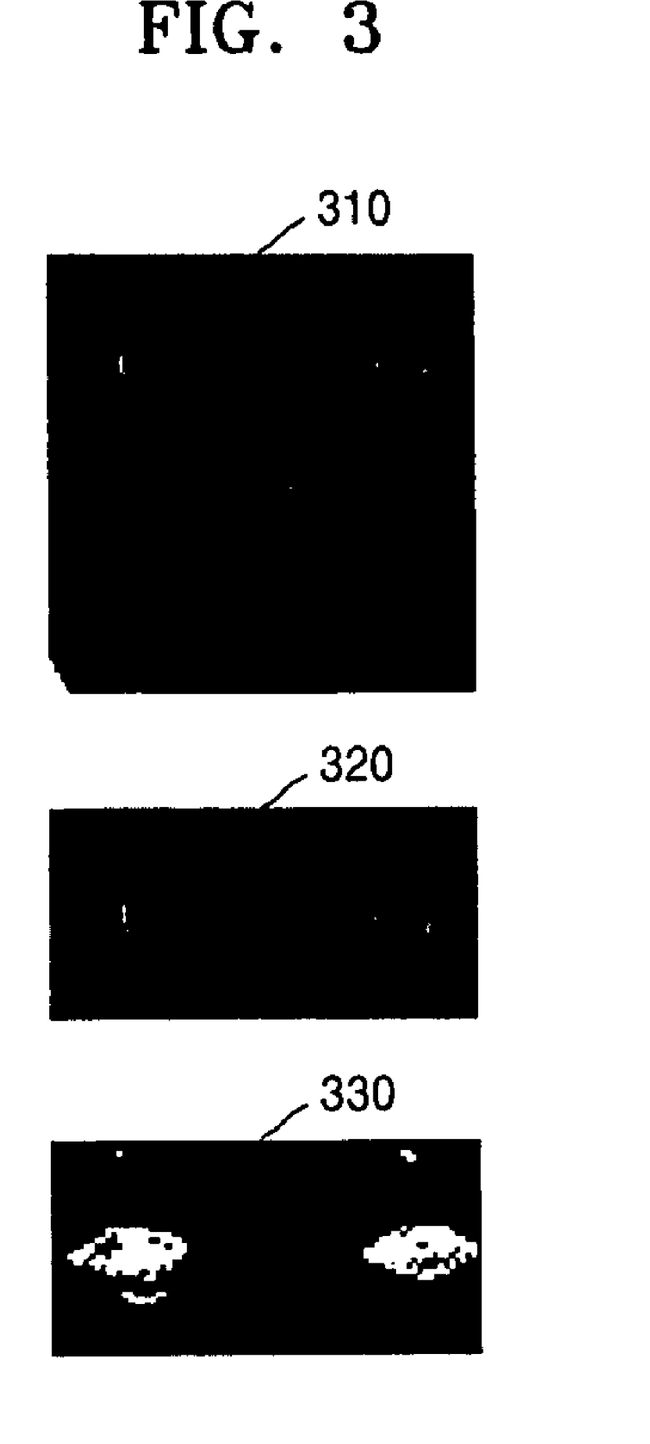
FIG. 3 is a view illustrating an example of right and left eye candidate regions detected using a symmetrical component extraction method according to the present invention.
Figure 4:
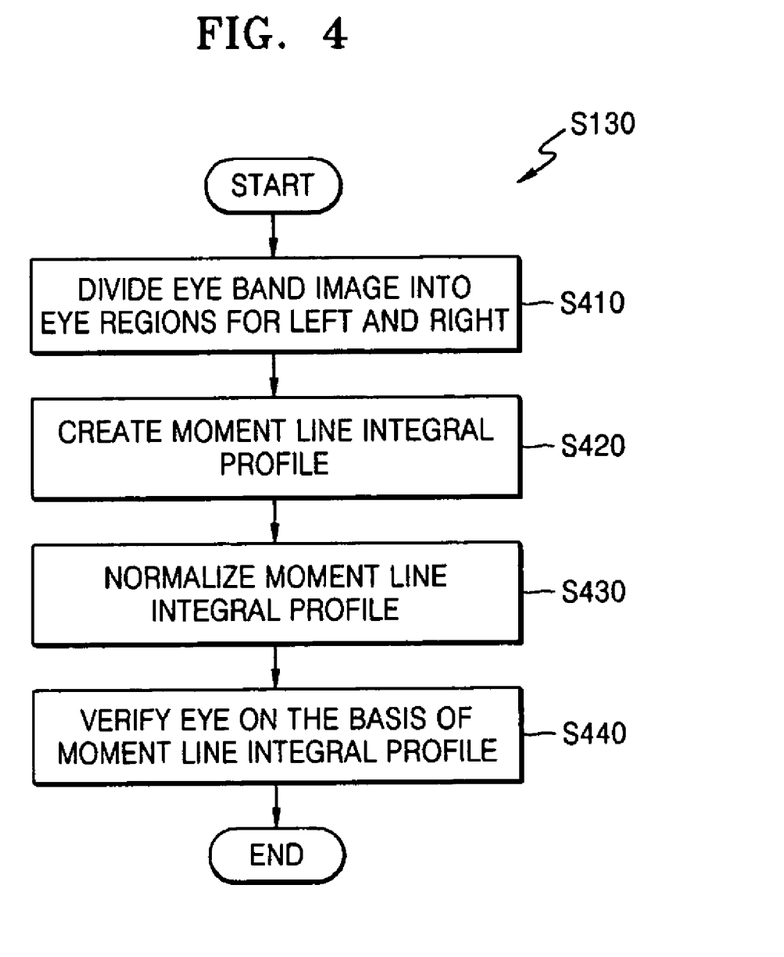
FIG. 4 is a flowchart illustrating in more detail an operation S130 of finding out a line integral moment profile and verifying an eye region using the found line integral in a method of detecting an eye according to the present invention.
Figure 5A:
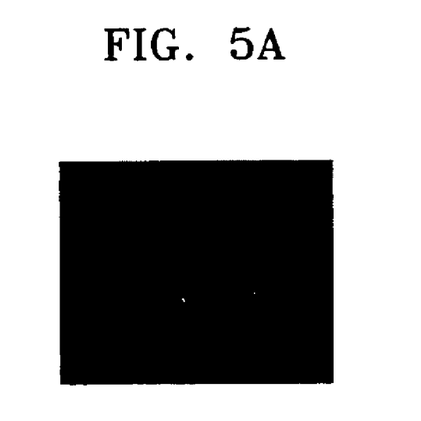
FIG. 5A is a view illustrating a left eye region in an eye band in a method of detecting an eye according to the present invention.
Figure 5B:
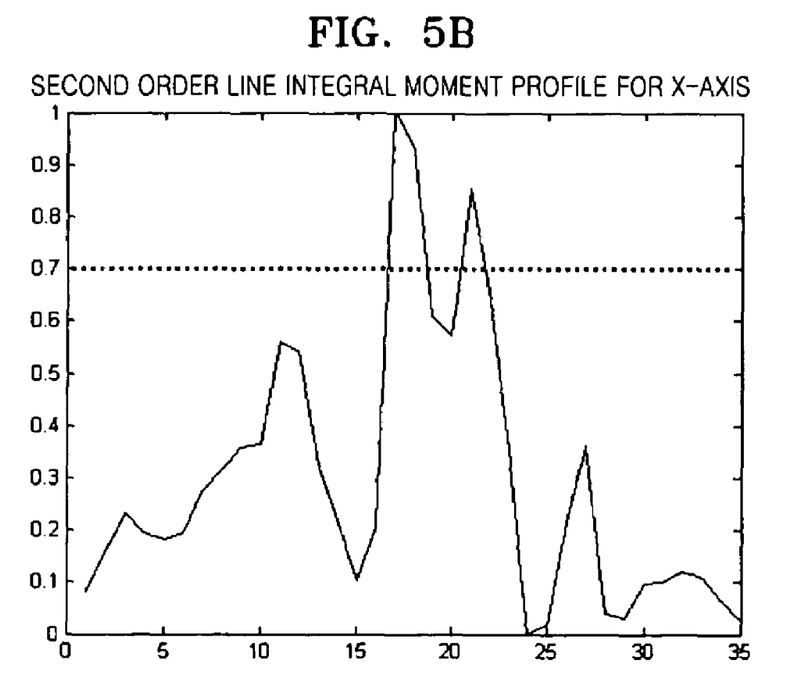
FIGS. 5B and 5C are views illustrating a second order line integral moment profile for an x-axis and a second order line integral moment profile for a y-axis applied to FIG. 5A.
Figure 5C:
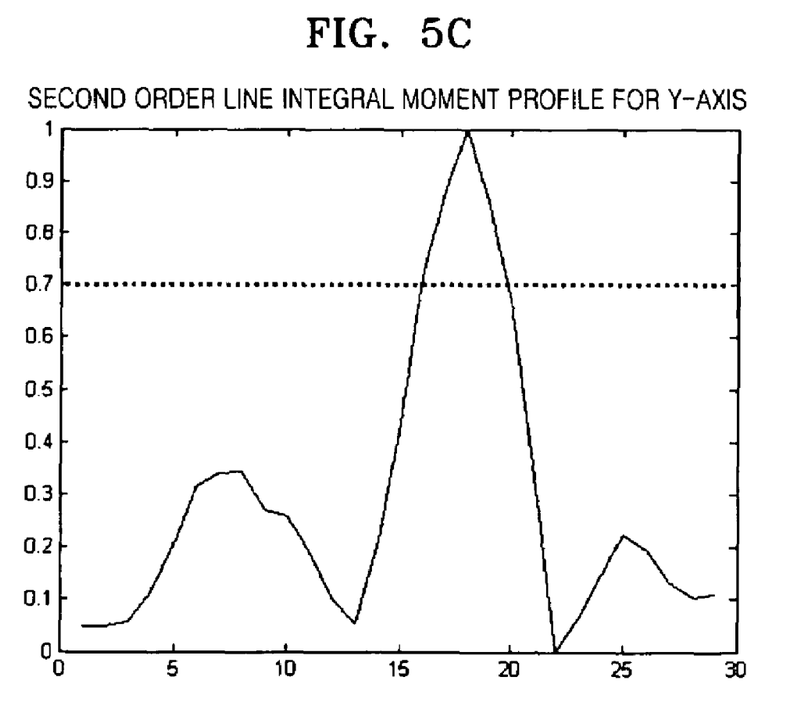
Figure 6:
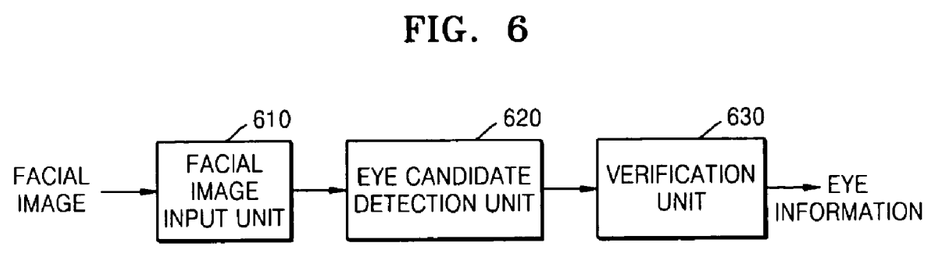
FIG. 6 is a block diagram illustrating the construction of an apparatus of detecting an eye according to the present invention.
Figure 7:
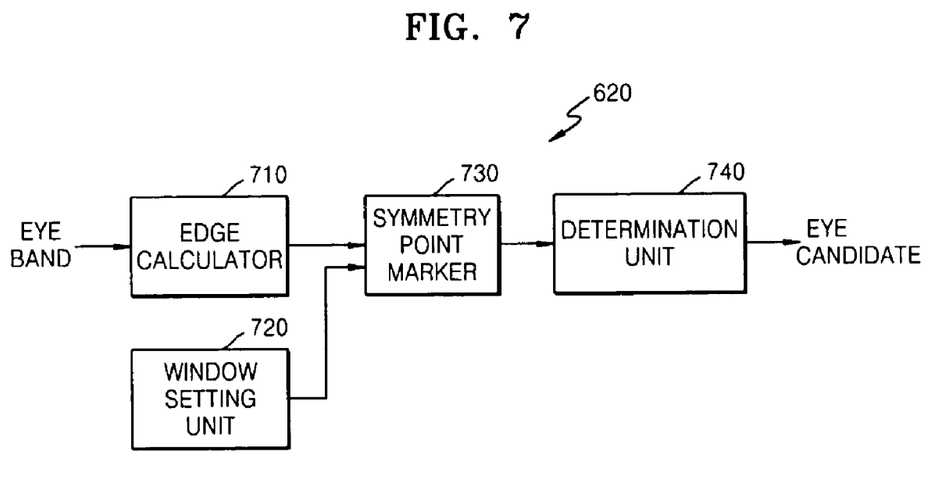
FIG. 7 is a block diagram illustrating the detailed construction of an eye candidate detection unit 620 of FIG. 6.
Figure 8:
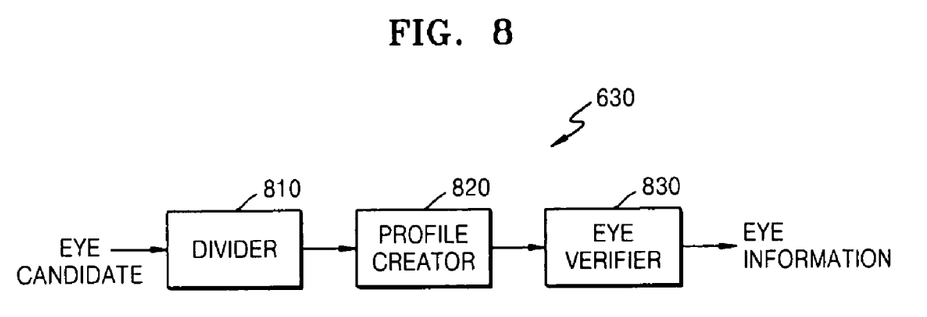
FIG. 8 is a block diagram illustrating the detailed construction of a verification unit 630 of FIG. 6.
Figure 9:
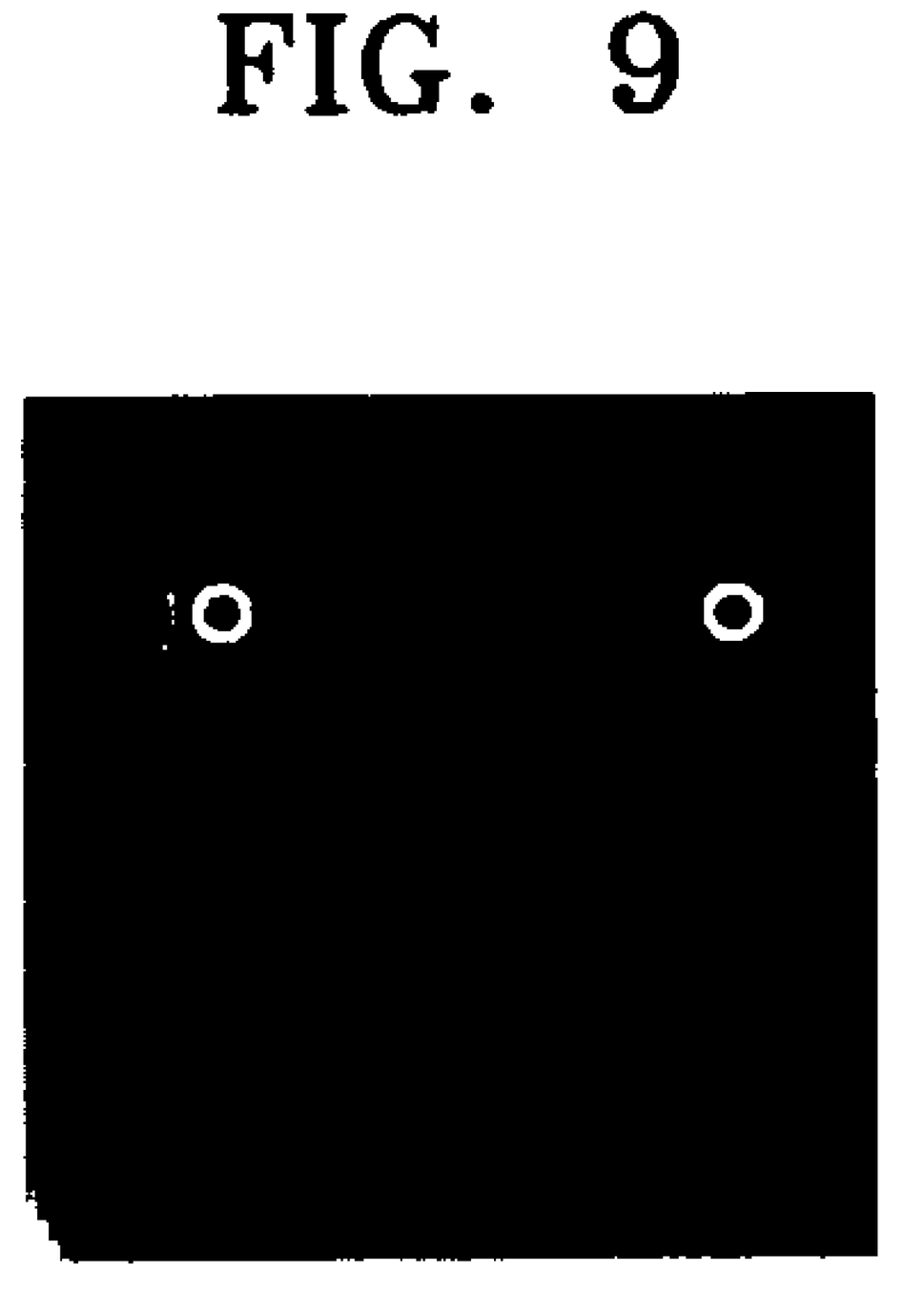
FIG. 9 is a view illustrating results of the eye detection according to the present invention.

The present invention will now be described more fully with reference to the accompanying drawings, in which exemplary embodiments of the invention are shown. A method and apparatus of the present invention will be described simultaneously for convenience. FIG. 1 is a flowchart of a method of detecting an eye according to the present invention, and FIG. 2 is a flowchart illustrating in more detail an operation S120 of detecting eye candidate regions using a symmetrical component extraction method. Since one eye has an elliptical shape and thus has symmetry, detection of an eye is performed using this characteristic. FIG. 3 is a view illustrating an example of right and left eye candidate regions detected using a symmetrical component extraction method according to the present invention, and FIG. 4 is a flowchart illustrating in more detail an operation S130 of finding out a line integral moment profile and verifying an eye region using the found line integral. Also, FIG. 5A is a view illustrating a left eye region in an eye band in a method of detecting an eye according to the present invention, and FIGS. 5B and 5C are views illustrating a second order line integral moment profile for an x-axis and a second order line integral moment profile for a y-axis applied to FIG. 5A. Also, FIG. 6 is a block diagram illustrating the construction of an apparatus of detecting an eye according to the present invention, FIG. 7 is a block diagram illustrating the detailed construction of an eye candidate detection unit 620 of FIG. 6, and FIG. 8 is a block diagram illustrating the detailed construction of a verification unit 630 of FIG. 6. FIG. 9 is a view results of the eye detection according to the present invention.

Overall description of the present invention will be made with reference to FIGS. 1 through 6. When a facial image is inputted in operation S110, a facial image input unit 610 roughly extracts an eye band region from the obtained image. That is, a curve of a contrast image projected on a y-axis is calculated, y coordinates of a portion representing a value less than a critical value are extracted from the curve, and a predetermined upper band on a y-axis where an eye is expected to exist is extracted from a facial portion of the eye band region or an entire face. An eye candidate detection unit 620 calculates eye candidate regions each having symmetry using a symmetrical component extracting method for the extracted region in operation S120. Since one eye has an elliptical shape and thus has symmetry, the eye candidate regions are calculated through the above processes.

Next, a verification unit 630 divides each of the eye candidate regions into two portions to obtain a region containing a left eye and a region containing a right eye. A moment line integral verification is performed on the left eye and then the moment line integral verification is performed on the right eye. Here, the moment line integral verification obtains a contrast value from an image obtained using the facial region and the eye region, obtains normalized line integral moment profiles of the contrast value having less than third order in horizontal/vertical axes, and inputs a portion obtained using a symmetrical component extraction method to a profile curve to find out a value. Next, whether a value obtained from the moment line integral method exceeds a critical value in operation S130 or not is determined. When any value exceeding the critical value is not detected during the above processes, the initial operation S110 is performed again to obtain a new facial image and the above operations are repeated until a portion exceeding the critical value in the obtained facial image.

Next, when the portion exceeding the critical value is detected, the portion is judged as an eye and the result is outputted in operation S140.

FIG. 2 is a flowchart illustrating in more detail an operation S120 of detecting eye candidate regions from an image using a symmetrical component extraction method in the method of detecting the eye, and FIG. 7 is a block diagram illustrating the detailed construction of the eye candidate detection unit 620.

When an eye band image is inputted in operation S210, an edge calculator 710 obtains the size and the phase of an edge per each pixel in operation S220. A window setting part 720 creates a window for a limited portion (N×N pixel) from the obtained image and compares the phases and sizes of the limited portion in operation S230. A symmetrical point marker 730 checks whether the size and the phase of an edge at left and right sides located a predetermined distance from a center point have a value greater than the critical value and marks the pixel while searching an image in operation S240. The window is moved in the eye band image to find and mark a pixel satisfying the condition (i.e., the size and the phase of the pixel is greater than the critical value). These processes are constantly performed until the window is applied to a last pixel of the eye band in operations S250 through S260.

When the pixels are marked more than a critical value as a result of analysis of the number of times of markings for the pixels, a determination part 740 determines the corresponding portion as an eye candidate portion in operation S270. The process is a process of removing noises and performing labeling. All of the detected portions are regarded and outputted as eye candidate regions in operation S280.

The symmetrical component extraction method and moment line integral used for verifying the facial region will now be described below. The symmetrical component extraction method is a method of measuring symmetry of an object without prior knowledge of the object's shape. According to this method, the size of the symmetry of each pixel is obtained using a distance between neighboring pixel pairs, the phases and the sizes of the gradients of the pixel pairs as follows.

$$M(p) = \sum_{(q,r) \in \gamma(p)} D(q,r) P(q,r) g_q g_r \qquad \text{Equation 1}$$

where, $\gamma(p)$ represents a set of neighboring pairs (q,r) located at the same distance from p. That is, $\gamma(p)=(q,r)|(q,r)/2=p$. $D(q,r)P(q,r)g_q g_r$ is the size of symmetry at a point p. $D(q,r)$ represents a function weighting a distance between q and r, and $P(q, r)$ represents a function weighting spacial gradient's phases ($\Theta_q$, $\Theta_r$) at q and r. Also, $g_q$ and $g_r$ represent spacial gradient's sizes of q and r, respectively.

When pixels having symmetry with respect to each other exist in an inputted image, the pixels may be detected using Equation 1. That is, since one eye has an elliptical shape and thus has symmetry, it may be detected using Equation 1.

FIG. 3 is a view illustrating an example of eye candidate regions detected through the above processes. FIG. 3A is a view of an inputted facial image, FIG. 3B is a view of an eye band image, and FIG. 3C is a view illustrating region having symmetry for right and left eyes detected using a symmetrical component extraction method.

FIG. 4 is a flowchart illustrating in more detail an operation S130 of finding out a line integral moment profile and verifying an eye region using the found line integral in a method of detecting an eye according to the present invention, and FIG. 8 is a block diagram illustrating the detailed construction of the verification unit 630 of FIG. 6.

A divider 810 divides the inputted eye band image 310 into two portions in a horizontal direction, regards a left side image as an image containing a left eye, and regards a right side image as an image containing a right eye in operation S410. A profile creator 820 creates profiles representing line integral values of contrast in an x-axis and a y-axis, respectively, with respect to an image containing one eye in operation S420. That is, an image's line integral moment of less than third order is obtained. Here, since a second order moment profile has a highest value for the portion of the pupil of the eye and has a relatively small value for eyebrows, the pupil of the eye and the eyebrows are discriminated. After that, the moment profile is normalized in operation S430. The normalizing of the moment profile is intended for obtaining a strong result even when brightness of an inputted entire image changes. When a line integral moment profile curve is obtained, a critical value obtained in advance through an experiment is applied to the line integral moment profile curve. Next, an eye verifier 830 inputs a coordinate of a pixel found using the symmetry component extraction method to the line integral moment profile curve to check whether the line integral moment profile curve exceeds a critical value defined by the moment profile. When the line integral moment profile curve exceeds the critical value, the eye verifier 830 judges a portion that corresponds to the line integral moment profile curve as an eye in operation S440.

The line integral moment is calculated using Equation 2 below $$\bar{x} = \int I(x,y) f(x,y) dx$$

$$\bar{y} = \int I(x,y) f(x,y) dx$$

$$\mu_{pq}(x,y) = \int (I(x,y)-\bar{x})^p (I(x,y)-\bar{y})^q f(x,y) dx dy$$

Equation 2 where, value of pair (p,g) is one of (0,2), (2,0), (0,3), (3,0), . . . I (x,y) represents a brightness value of a pixel at a point (x,y), $\bar{x}$ and $\bar{y}$ are zeroth order line integral moment profiles of an x-axis and a y-axis, respectively. f(x,y) is a probability distribution of a pixel and μ(p,q) is a moment profile of greater than zeroth order. Examination of a profile for an eye region by Equation 2 shows that an eye portion particularly has a conspicuous maximum value. It is possible to verify an eye candidate region is an eye when the eye candidate region is detected by normalizing a profile using this characteristic first and setting an appropriate critical value.

FIGS. 5B and 5C are views illustrating second order line integral moment profiles obtained through theses processes. FIG. 5A is a view of an inputted region containing an eye and FIGS. 5B and 5C are views illustrating profiles obtained by calculating second order line integral moments. In the drawings, a portion included by a dotted line represents a critical value and it is possible to estimate the position of coordinate of an eye for an x-axis and a y-axis from the critical value. That is, x and y coordinates in a region obtained by the symmetrical component extraction method are inputted to the profile. When the profile exceeds the critical value of each of the profiles, the coordinates are determined as an exact position of the eye.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, a font ROM data structure according to the present invention may be realized as a computer-readable code on a recording medium such as ROM, RAM, CD-ROMs, magnetic tapes, hard disk drives, floppy disks, flash memory, optical data storage devices.

As described above, the method and apparatus of detecting the eye using the symmetry and moment characteristics of the object according to the present invention detects eye candidate regions among elements of an inputted facial image, extracts an element having symmetry using the symmetry component extraction method, inputting the eye candidate regions to a moment line integral method to verify the eye candidate regions. Therefore, the present invention provides eye detection having simple and strong characteristics in detecting an eye.

Also, the present invention improves processing speed and reliability in eye detection, thereby making real-time eye region detection possible.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. One or more computer-readable medium comprising computer-readable instructions thereon which, when executed by a computer, performs a method of detecting an eye using symmetry and moment characteristics of an object, the method comprising:
    extracting an eye band from a facial image;
    extracting a symmetrical component from the eye band to detect eye candidates each having symmetry;
    obtaining moment line integral on the basis of contrast of an image of the eye band and inputting the obtained moment line integral to a coordinate of each of the eye candidates to verify each of the detected eye candidates,
    judging one of the eye candidates as an eye when one of the obtained moments line integrals to the coordinate of one of the eye candidates exceed a predetermined critical value, and
    wherein the obtained image line integral moment is less than a third order.

2. The method of claim 1, wherein the extracting of the eye band comprises:
    extracting y coordinates having a value less than a predetermined critical value from a curve obtained by calculating a curve of a contrast image projected on a y-axis; and
    extracting a predetermined band on a y-axis as the eye band on the basis of the y coordinates, or extracting an upper eye band expected to be located on the position of an eye on a y-axis as the eye band.

3. The method of claim 1, wherein the extracting the symmetrical component comprises:
    calculating the size and the phase of an edge of each pixel contained in the image of the eye band;
    setting a window of a predetermined size covering the image of the eye band and comparing the sizes and the phases of edges of the pixels contained in the window to mark a symmetrical point; and
    calculating the number of times of the marking for each pixel and selecting a marked portion as one of eye candidate regions when the calculated number of times of the marking exceeds a predetermined critical value.

4. The method of claim 1, wherein the obtaining moment line integral comprises:
   equally dividing the image of the eye band into two regions in a vertical axis;
   calculating moment profiles representing line integrals of contrast in an x-axis direction and a y-axis direction, respectively with respect to each of the divided images; and
   inputting a pixel coordinate to each of the moment profiles and judging one of the eye candidates as the eye when one of the moment profiles exceeds the predetermined critical value.

5. The method of claim 4, wherein the calculating of the moment profiles further comprises normalizing the moment profiles.

6. An apparatus of detecting an eye using symmetry and moment characteristics of an object, the apparatus comprising:
   a facial image inputting unit extracting an eye band from a facial image of a user to be verified, extracting y coordinates each having a value less than a predetermined critical value from a curve obtained by calculating a projection curve of a contrast image of the eye band with respect to a y-axis, and extracting a predetermined upper band on the y-axis as the eye band and outputting the same;
   an eye candidate detection unit extracting symmetrical components from the extracted eye band to detect eye candidates each having symmetry; and
   a verification unit receiving the eye candidates to verify each of the received eye candidates using moment line integral obtained on the basis of contrast of an image of an eye,
   wherein the verification unit is configured to judge one of the eye candidates as an eye when the moment line integrals exceed a predetermined critical value, and
   wherein the moment line integral is less than a third order.

7. The apparatus of claim 6, wherein the eye candidate detection unit comprises:
   an edge calculator calculating the size and the phase of an edge of each pixel contained in the image of the eye band;
   a window setting unit setting a window of a predetermined size covering the image of the eye band;
   a symmetrical point marker comparing the sizes and the phases of edges of pixels contained in the window to mark symmetrical points; and
   a determination unit calculating the number of times of the marking for each pixel and selecting a marked portion as one of eye candidate regions when the calculated number of times of the marking exceeds a predetermined critical value.

8. The apparatus of claim 6, wherein the verification unit comprises:
   a divider equally dividing the image of the eye band into two regions in a vertical axis;
   a profile creator calculating moment profiles representing line integrals of contrast in an x-axis direction and a y-axis direction, respectively with respect to each of the divided images; and
   an eye verifier inputting a pixel coordinate to each of the moment profiles and judging one of the eye candidates as the eye when one of the moment profiles exceeds the predetermined critical value.

* * * * *